United States Patent Office
2,694,039
Patented Nov. 9, 1954

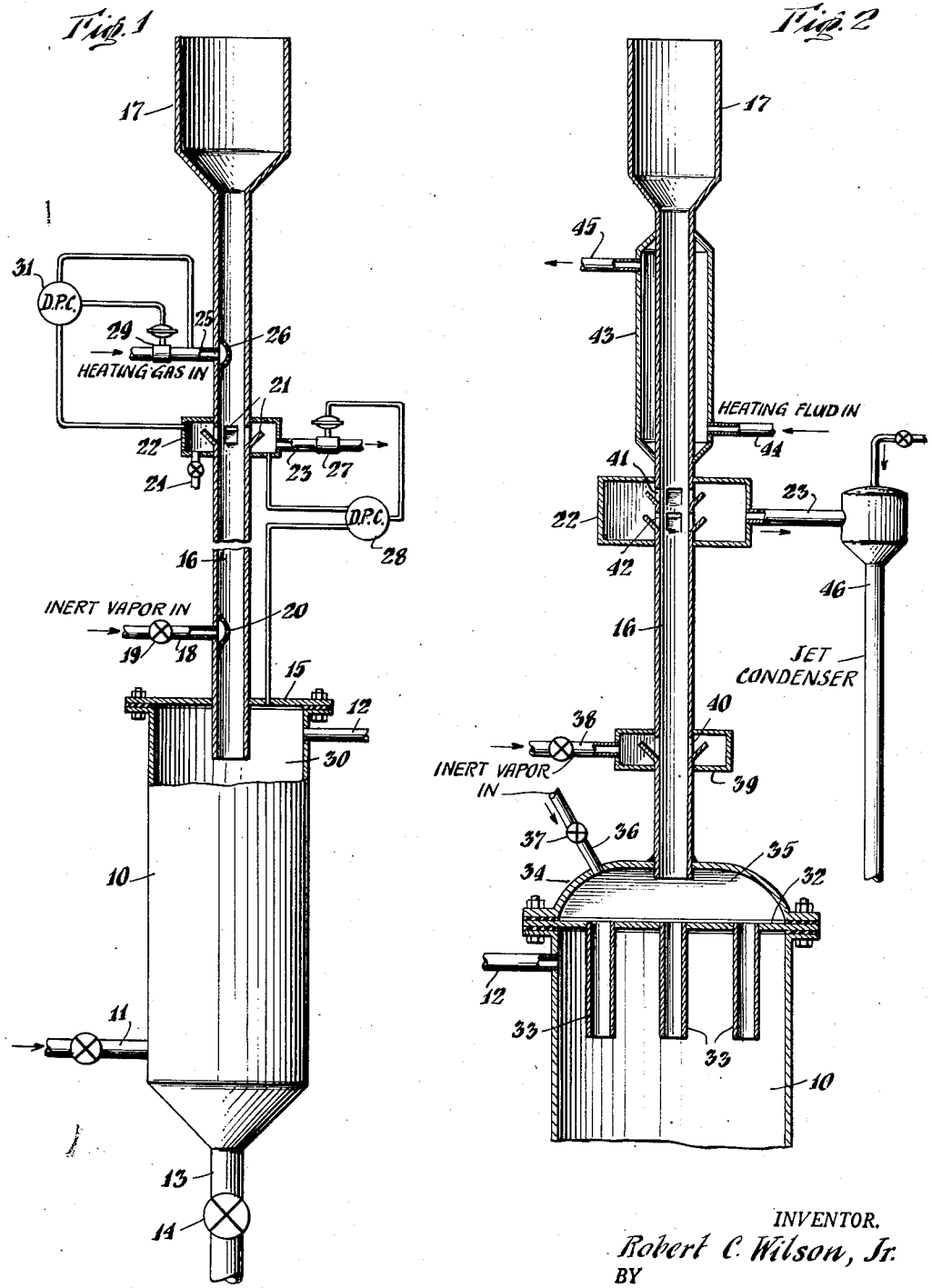

2,694,039
APPARATUS FOR SOLID TRANSFER

Robert C. Wilson, Jr., Woodbury, N. J., assignor to Socony-Vacuum Oil Company, Incorporated, a corporation of New York Application February 28, 1952, Serial No. 273,969

2 Claims. (Cl. 202—262)

This application is a continuation-in-part of my application Serial Number 582,952, filed in the United States Patent Office on March 15, 1945, now Patent No. 2,626,235.

This invention relates to an apparatus for handling solid material in gas-solid or vapor-solid contact processes. Such processes may involve gas-solid heat exchange, gas adsorption, gasiform reactions in presence of catalysts, gas-solid reactions, solid regeneration or solid treatment. Typical processes are those of the high temperature treatment of oil bearing shales for recovery of hydrocarbons and the catalytic cracking of petroleum gas oil for the production of gasoline. For example, in the treatment of oil bearing shales, it is well known that hydrocarbons may be vaporized and recovered therefrom by the heating of such shales to temperatures usually in excess of about 1000° F. Such processes may be operated at substantially atmospheric pressures or at pressures thereabove and generally involve vapors which are condensable at ordinary atmospheric conditions.

A convenient means for solid introduction to gas-solid contact zones is by means of a substantially compact elongated column of downwardly gravitating solid particles. This invention is specifically directed to certain improvements in this method of solid feed introduction. When such feed legs are used for solid introduction, small quantities of gasiform material from the reaction zone tend to escape upwardly through the solid feed leg. In order to prevent such reactant or contact gas escape, an inert seal vapor, such as steam, may be introduced into the lower section of the feed leg. Some of this steam makes its way upwardly through the feed leg and if the solid feed particles are at a relatively low temperature, such as atmospheric temperature, the steam will be condensed on the solid particles. This condensation of vapor may eventually cause clogging or bridging of the solid flow in the feed leg resulting in partial or complete stoppage of solid flow to the contacting zone.

It is a major object of this invention to provide an apparatus for introduction of a relatively low temperature supply of solid particles to a gas-solid or vapor-solid contacting zone.

A specific object of this invention is the provision of an apparatus for gravity feeding of particle form solid particles to a gas-solid contacting zone while preventing substantial escape of contacting gases and while preventing substantial vapor condensation on the feeding solid particles.

Another specific object of this invention is the provision of an apparatus for introducing oil-bearing shale particles into a high temperature shale treating zone.

These and other objects of this invention will become apparent from the following description of the invention.

Before proceeding with this description, certain terms used hereinbefore and hereinafter in describing the invention and in the claiming thereof will be defined. The terms "gas" or "gasiform material" or "gasiform fluid" unless otherwise specifically modified to the contrary are intended to broadly cover material in the gaseous phase at the conditions involved irrespective of the normal phase of the material at normal atmospheric conditions. The terms "vapor" or "vaporous material" are intended to mean material in the gaseous phase which would exist in the liquid phase under the temperature and pressure conditions of the feed solid at the entrance of the solid feed conduit.

The terms "normally gaseous fluid" or "normally gaseous material" are intended to mean material in the gaseous phase which normally exists in the gaseous phase under the temperature and pressure conditions of the feed solid at the entrance to the solid feed conduit.

The invention may be more readily understood by reference to the attached drawings of which Figure 1 is an elevational view, partially in section, of a preferred form of this invention and Figure 2 is a similar view of a modified form of the invention. Both of these drawings are highly diagrammatic in form.

Turning now to Figure 1, we find a closed contacting vessel 10, which may take any suitable form adapted for the particular gas solid contact operation involved. A gasiform material inlet 11 is connected into the lower section of the vessel and a gasiform material outlet 12 at the upper section thereof. Gas distributor members (not shown) may be provided in association with inlet conduit 11 and these may take any of a number of forms well known to those skilled in the art. A solid material feed conduit 16 extends a considerable distance above the top 15 of vessel 10 and on its lower end extends through top 15 and a short distance therebelow so as to provide gas disengaging space 30. The conduit 16 should be of sufficient length to insure flow of solid material therethrough and into the contacting vessel 10 against whatever pressure may exist therein. A pipe 18 with valve 19 thereon connects into the lower section of conduit 16, and a perforated, rounded plate 20 is provided over the open end of pipe 18 to prevent solid flow thereinto while permitting gas flow therethrough. A number of louvered openings 21 are provided at an intermediate level on conduit 16; these openings are so constructed as to permit withdrawal of gasiform material without substantial loss of solid particles. A manifold box 22 is fastened to the conduit 16 around the louvered section and a vapor outlet pipe 23 is connected into this manifold box. A drain pipe 24 may be provided on the bottom of the manifold box for periodical removal of any small quantity of entrained solid particles. A pipe 25 for gas inlet is connected into the conduit 16 at a level substantially above that of the louvered section and a perforated metal plate 26 is provided at its inlet to prevent solid flow into pipe 25.

In operation a substantially compact column of solid particles may be maintained in vessel 10 by proper control of its rate of withdrawal therefrom through conduit 13 and valve 14. The contacting or reactant gases are heated to the desired temperature in an outside apparatus (not shown) which may be of conventional construction and then admitted through conduit 11 and passed upwardly through the solid material in vessel 10. The gaseous products are then withdrawn through conduit 12 through which they pass to a suitable recovery system (not shown). If desired, gasiform material may be introduced through conduit 12 and withdrawn through conduit 11 to effect concurrent flow of solid and gaseous material through the vessel 10. The temperature and pressure conditions within the vessel 10 will vary depending upon the operation involved. Generally, elevated temperatures substantially above atmospheric temperature and pressures from about atmospheric to about 50 pounds per square inch may be maintained. A bed of particle form solid feed material is maintained in hopper 17 and feed therefrom downwardly through the conduit 16. The size of such solid particles may vary depending upon the operation involved but will be generally of sizes within the range of about 0.01 to 1 inch solid particle diameter. Thus, for example, the average particle diameter may be of the order of 0.02 to 0.2 inch for hydrocarbon cracking catalysts, while for oil bearing shales the particle size may be generally larger.

An inert vapor, such as steam, is introduced into the feed conduit through pipe 18 and passes in part downwardly through conduit 16 and out with contact gases through conduit 12 and in part upwardly through the compact stream of solid particles in conduit 16 to be withdrawn through louvered openings 21 and outlet pipe 23. An inert normally gaseous fluid, such as flue gas, is introduced through pipe 25 into conduit 16 and this stream divides, part passing upwardly and out through the hopper 17 and part passing downwardly to be withdrawn through pipe 23 along with the seal vapor. The inert gas so introduced is heated in a suitable external apparatus (not shown) such as a conventional "line" burner and introduced into conduit 16 at such a temperature and rate as to heat the moving solid particles in that section of the conduit 16 above the louvered outlets 21, so that said solid particles, upon reaching the louvered section 21, are at a temperature above the condensation temperature of the seal vapor employed. The inert gas passing downwardly through the solid material from inlet pipe 25 further serves to substantially prevent flow of seal vapor upwardly into that section of the column above the louvered outlets 21 where the solid temperature is below the condensation temperature of the seal vapor. Thus the condensation of seal vapor upon the solid feed particles is substantially avoided and the difficulties arising from such condensation are eliminated.

As hereinabove stated, the height of the conduit 16 should be sufficient to provide a head of solid particle column therein sufficient to overcome the gaseous pressure within the vessel 10. The required height will obviously vary depending on the operation involved and especially upon the density and physical properties of the solid particles involved. For example, in the case of clay-type granular material of about 40 pounds per cubic foot apparent unpacked density a height of about four feet per pound of pressure to be overcome in vessel 10 has been found satisfactory. The required height will be greater for less dense materials and less for more dense materials. If the pressure at the seal vapor outlet conduit 23 is to be substantially atmospheric, then the height of conduit 16 up to that level should be sufficient to permit a head of solid material between that level and the vessel 10 somewhat greater than that required to overcome the differential in pressure between that in vessel 10 and atmospheric pressure. In order to permit maximum utilization of available column height, especially in those operations wherein the pressure in vessel 10 is substantial, it is desirable to control the gaseous pressure at the level of conduit 23 above atmospheric and preferably near that pressure which would exist at the level of conduit 23 if it were absent and the seal vapor were forced to flow upwardly through the entire conduit 16. Thus, for example, assuming a gaseous pressure in the vessel 10 of 5 pounds per square inch gauge and a solid clay-type material of 40 pounds per cubic foot density, supplied to hopper 17 at atmospheric pressure, in the absence of vapor withdrawal at louvers 21 the conduit 16 should be about 20 feet high to overcome the pressure within vessel 10; and in order to allow for fluctuations in pressure, the conduit should be about 25 to 30 feet in height. Now assuming the seal vapor inlet 18 to be about 1 foot above the lower end of conduit 16 and the seal vapor outlet 23 to be about 4 feet further up the conduit 16, the gaseous pressure at the level of outlet 23 should be controlled near about 4 pounds per square inch gauge or slightly thereabove. Thus, a diaphragm valve 27 provided on outlet 23 would be regulated to control the vapor and normally gaseous fluid flow through conduit 23 such that the pressure within conduit 16 at this level is maintained within a narrow range of pressures, say 4¼ to 4½ pounds per square inch, which are about three-quarters of a pound per square inch below the pressure in vessel 10. The diaphragm valve 27 is so regulated by means of the differential pressure control instrument 28. Similarly, another diaphragm valve 29 is provided on inert gas inlet pipe 25 to control through differential pressure controller 31 the pressure within conduit 16 at the level of pipe 25 slightly above that in the conduit 16 at the seal vapor withdrawal level. The purpose of this control is to insure downward passage through conduit 16 of at least part of the normally gaseous heating fluid introduced through pipe 25. Inasmuch as the length of conduit between the levels of inlet pipe 25 and outlet pipe 23 is lost for purposes of overcoming pressure in the vessel 10, it is desirable to limit the length of the column between these levels as low as is consistent with provision of the proper heating of the solid material by the normally gaseous fluid. Since the heat transfer rates for direct contact of gases with solids are very high, generally the length of column between the levels of inlet pipe 25 and outlet pipe 23 need be no greater than about one to two feet. The method of operating disclosed hereinabove, involving the use of differential pressure control mechanisms and the broad general method and apparatus for supplying relatively cool solid feed material into a gas-solid contacting zone operated under pressure while preventing substantial vapor condensation on the solid feed material, is the subject of claims in my application Serial Number 582,952, filed in the United States Patent Office on March 15, 1945. The present invention deals more particularly with the method and apparatus described hereinbelow.

Turning now to Figure 2, we find another form of the invention modified mainly with respect to the method for heating the solid particles in the upper section of the feed conduit and with respect the method for preventing passage of condensable vapors into the portion of the feed conduit wherein condensation would occur. Like members in Figures 1 and 2 bear like numerals. In Figure 2, only the upper section of the contacting vessel 10 is shown and it will be noted that the upper section of this vessel is somewhat modified by provision of partition 32 and dependent solid material distributor pipes 33 and flanged top 34. The partition 32 and flanged top 34 provide a solid material distribution space 35 which may also serve as a seal section by provision of a seal vapor inlet pipe 36 having valve 37 thereon on the vessel top 34. Seal vapor may, if desired, be introduced through conduit 36, in which case part of the seal vapor enters the lower end of the solid material feed conduit 16 and passes upwardly through the solid material therein, thereby eliminating the necessity for seal vapor introduction directly into the conduit 16 at some level thereabove. On the other hand, if desired, seal vapor may be introduced directly into the conduit 16 through inlet conduit 38, manifold box 39 and louvered openings 40 provided on the lower section of conduit 16. The seal vapor is withdrawn through louvered openings 41 and 42 which are similar to those shown in Figure 1 except that a double row of such openings is provided to further limit solid particle entrainment. A jacket 43 having heating fluid inlet 44 and outlet 45 thereon is provided along a section of conduit 16 above the seal gas withdrawal level to provide for heating of the solid material by indirect heat transfer with a heat exchange fluid. Any suitable heat exchange fluid, such as superheated steam, molten alloys or molten salts may be circulated through the jacket 43 and through a suitable external heating and circulating system which may be of conventional design and is, consequently, not shown. Other suitable indirect heat transfer arrangements may be provided instead of the jacket arrangement shown, such as small tubes within the upper section of conduit 16. When the solid material is so heated by indirect heat transfer, it is desirable to maintain a slightly reduced pressure on the seal vapor outlet conduit 23 so as to prevent flow of seal vapor into the cooler solid material thereabove. This may be effected by the use of a jet condenser 46, as shown. In this arrangement the seal vapor is drawn into the head or condensing section 50 and is mixed with a cooling liquid such as water, oil, etc. entering via pipe 51, whereby the seal vapor is condensed so as to create a vacuum in the condensing section of the barometric condenser. As a result, a vacuum or a reduced pressure is maintained in the conduit 16 at the intermediate level of seal vapor withdrawal therefrom. The condensate and cooling fluid pass downwardly through the barometric seal leg to an accumulator or sump from which it may be disposed of as desired.

The hereinabove described invention has been found particularly useful in a process for recovery of hydrocarbons at elevated temperatures from oil-bearing shales. In this process, superheated steam was introduced into the lower section of the solid feed conduit as a seal vapor to prevent the escape of hydrocarbons through the feed conduit. Shale particles ranging from 1 to 0.125 inch average diameter were introduced into the upper end of the feed conduit and utilizing the method and apparatus hereinabove described, uninterrupted continuous feed of shale to the treating zone was provided without the clogging and interruption of feed flow which ordinarily results due to steam condensation on the low temperature shale in the feed conduit.

It should be understood that the details of apparatus construction and operating conditions and the systems shown to which this invention may be applied are intended merely as exemplary and are in no way to be construed as limiting the scope of this invention except as it may be limited by the following claims.

I claim:

1. Apparatus for conducting gas-solid contact operations at pressures above atmospheric in the presence of a moving particle-form solid contact mass material which comprises: a reaction vessel adapted for passage therethrough of a particle-form solid material as a substantially compact column of downwardly moving solid particles, a gas inlet to said vessel and a gas outlet therefrom, an elongated solid material feed conduit extending vertically up from the upper section of said vessel, said conduit being open and unobstructed throughout its length and being of sufficient height that a greater head of solid material particles may be created therein than the operating pressure in said vessel, means to introduce particle-form solid material to the upper end of said conduit, a gas inlet communicating with the interior of said feed conduit near its lower end, a plurality of louvered openings around said conduit at a level spaced substantially above said inlet means, said louvered openings being adapted to permit flow of gas from said conduit while retaining solid material within said conduit, an outlet manifold box connected around said column to enclose said louvered openings, a jet condensor positioned apart from said conduit, conduit means connecting said outlet manifold box to said jet condensor, and means associated with a section of said conduit above said fluid withdrawal means for heating said solid particles within said conduit to a temperature above the condensation temperature of said inert sealing vapor.

2. Apparatus for conducting gas-solid contact operations at pressures above atmospheric in the presence of a moving particle form solid contact mass material which comprises: a reaction vessel adapted for passage therethrough of a particle form solid material as a substantially compact column of downwardly moving solid particles while contacting a suitable gasiphase contact fluid, an elongated solid feed conduit extending upwardly from the upper section of said vessel, said conduit being open and unobstructed throughout its length, means to supply solids to the upper end of said feed conduit, inlet means to introduce an inert seal vapor into the lower section of said feed conduit, a barometric jet condensor positioned apart from said conduit, members defining a confined passageway communicating the condensing section of said condensor with the interior of said feed conduit at an intermediate level a substantial distance below the upper end of said feed conduit and above said seal vapor inlet means, and means associated with a section of said feed conduit above said intermediate level for heating the solids within said feed conduit to a temperature above the condensation temperature of said inert seal vapor.

References Cited in the file of this patent

UNITED STATES PATENTS

| Number | Name | Date |
|---|---|---|
| 2,320,318 | Simpson et al. | May 25, 1943 |
| 2,448,223 | Lantz | Aug. 31, 1948 |

OTHER REFERENCES

Perry: "Chemical Engineer's Handbook," second edition; published 1941 by McGraw-Hill Book Co., New York, New York, page 1073.